United States Patent [19]

Stähler

[11] 4,284,503
[45] Aug. 18, 1981

[54] DEVICE FOR AERATING SEWAGE OR SEWAGE-SLUDGES

[76] Inventor: Theo Stähler, Mühlenhof, 6253 Hadamar-Niederzeuzheim, Fed. Rep. of Germany

[21] Appl. No.: 132,905

[22] Filed: Mar. 24, 1980

[30] Foreign Application Priority Data

Mar. 27, 1979 [DE] Fed. Rep. of Germany ....... 2911975

[51] Int. Cl.³ ............................................. C02F 3/08
[52] U.S. Cl. ..................................... 210/150; 261/86; 261/92
[58] Field of Search .................. 210/14, 17, 150, 151, 210/208, 219, 619; 261/85, 86, 92

[56] References Cited

U.S. PATENT DOCUMENTS

| | | | |
|---|---|---|---|
| 3,109,875 | 11/1963 | Schramm et al. | 210/150 |
| 3,540,589 | 11/1970 | Boris | 210/150 |
| 3,747,904 | 7/1973 | Gross | 210/219 |
| 3,886,074 | 5/1975 | Prosser | 261/92 |
| 3,962,087 | 6/1976 | Hartmann | 261/92 |
| 4,160,736 | 7/1979 | Prosser | 210/17 |
| 4,184,946 | 1/1980 | Kato | 210/615 |

FOREIGN PATENT DOCUMENTS

| | | | |
|---|---|---|---|
| 5553 | 11/1979 | European Pat. Off. | 210/150 |
| 2638665 | 3/1980 | Fed. Rep. of Germany. | |
| 54-99350 | 8/1979 | Japan | 210/151 |

Primary Examiner—Peter A. Hruskoci
Attorney, Agent, or Firm—Max Fogiel

[57] ABSTRACT

The invention relates to an aerating device for sewage and comprises a drum-like rotor which rotates in a trough and is divided, by axially-parallel partitions, into a plurality of outwardly-open radial chambers, the said partitions being equipped with peripheral outer surfaces having apertures so that during rotation of the drum a volume of air is trapped in each chamber. Internal baffels in said chambers act to direct the trapped air initially to the lagging portion of the chamber and then, past bottom dead center, to the leading portion of the chamber, thereby efficiently aerating the sewage.

18 Claims, 3 Drawing Figures

DEVICE FOR AERATING SEWAGE OR SEWAGE-SLUDGES

The invention relates to a device for aerating sewage or sewage-sludges, for the purpose of converting foreign, especially harmful, substances contained therein into harmless substances, the said device comprising a basin, for example a reaction or sludge-aerating basin, and a hollow element which is arranged to rotate therein about its axis, a portion of said hollow element protruding above the level of sewage when the basin is full. The hollow element is provided with a plurality of partitions directed parallel to and outwardly from the axis of rotation forming outwardly-open reaction chambers. Each partition is provided with front and rear surfaces adjacent its outer portion. The front surface extends downwardly at the point where the partition dips beneath the surface of the sewage, and the rear surface extends downwardly at the point where the portion emerges from beneath the surface of the sewage.

For the purpose of converting harmful substances contained in sewage or sewage-sludges, it is known to undertake aeration in order to oxidize the said harmful substances. When sewage is aerated, a mostly flaky sludge is formed, and this can be separated from the water in a subsequent settling basin. If necessary, the water and sludge may also be denitrated.

Sewage may be aerated in various ways. According to one particularly effective method, use is made of periodically immersed hollow elements equipped with apertures admitting water and air. These hollow elements allow air to be forced below the surface of the water and then to escape slowly. As the elements emerge, they lift the water and sludge with them allowing the water and sludge to trickle out gradually. This produces intensive aeration of the sludge with high conversion efficiency.

It is known, according to German OS No. 26 38 665, to arrange a plurality of hollow tubular elements equidistantly around the periphery of rotatable rim-gears and parallel with the surface of the water. As the rim-gears rotate, the hollow elements dip periodically in and out, thus carrying air into the water and lifting water and sludge out.

However, this arrangement of hollow elements is structurally complex. Furthermore, the volume of air carried below the surface of the water by the said elements is relatively small. More satisfactory in this respect is a design, also disclosed in the said prior publication, in which the hollow element is in the form of a drum suspended rotatably in the reaction basin with its axis above the surface of the water. The said element contains a plurality of partitions directed substantially radially outwardly and parallel with the axis of the element, the said partitions dividing the interior of the hollow element into chambers of equal size. Each of these partitions is provided with a front outer surface adjacent its outer edge, said surface extending downwardly at the point where the partition dips beneath the surface of the sewage. Each front outer surface is provided with an opening extending to the outer edge of the subsequent partition as viewed in the direction of rotation. As the downwardly extending outer surface enters the sewage, it combines with the partition to form a scoop which carries air below the surface. This air quickly escapes thereby aerating sewage outside the hollow element. As the scoop emerges from beneath the surface of the sewage, it brings with it water which, upon further rotation, trickles out of the said openings.

The structural simplicity of this design of hollow element, and the larger volume of air it handles, is obtained at the expense of the relatively large amount of power required to drive the hollow element. Furthermore, the conversion efficiency is unsatisfactory, since the volume of air carried into the water escapes relatively quickly from the chambers and reaches the surface just as quickly. The amount of oxygen absorbed into the sewage is small, corresponding to the brief contact period. This is particularly apparent if—as suggested—discs are arranged in the reaction chambers to provide surfaces to which biological growths, consisting of micro-organisms, may adhere. These growths would be insufficiently aerated by the rapidly escaping air.

In the case of a device of the type described at the beginning hereof, it is the purpose of the invention to design the hollow element in such a manner as to reduce the power required to drive it and to improve the conversion efficiency.

According to the invention, this purpose is achieved by providing rear outer surfaces of the partitions, as viewed in the direction of rotation, which face downwardly at the point where the partition emerges from beneath the sewage surface. This design of the rear surfaces of the partitions prevents the air carried below the surface of the water from escaping out of the hollow element while the latter is underwater. Whereas the front outer surface of each partition, which may also be a part of the outer wall of the hollow element, faces downwardly after the manner of a hollow scoop, thus carrying an air bubble below the surface of the water, the rear outer surface of each partition forms a kind of retaining scoop for the air bubble which passes, as the front outer surface of the one partition rotates, to the rear outer surface of the opposite partition in the chamber. This air bubble thus remains relatively longer in the reaction chamber than is the case in known designs, which means that considerably more oxygen is dissolved in the sewage and that the biological growths in the reaction chambers are thoroughly aerated. This is encouraged by the air being compressed underwater resulting in improved solubility of the oxygen in the water. All of this provides a substantial increase in reaction efficiency. For a given efficiency, therefore, the rpm of the hollow element, and the power required to drive it, may be reduced.

The air bubble near bottom dead centre also aids in driving the hollow element in its direction of rotation, thus compensating for the buoyancy of the air bubble formed upon immersion and persisting to bottom dead centre. This is not the case in existing designs since the air escapes from the reaction chamber before it can act in the direction of rotation. The power required to overcome the buoyancy against the direction of rotation is thus no longer required.

It is not essential for the front and rear outer surfaces of the partitions to face exactly downwardly upon immersion and emersion. Instead, the said partitions, and the outer parts thereof, may face obliquely downwardly. All that is essential is that the intended scoop-action shall carry an air bubble below the water upon immersion, and that this air bubble be at least substantially prevented from escaping from the hollow element.

According to the invention, the hollow element is equipped with partitions directed radially outwardly, the outer ends of which continue, in the form of covering webs, at least approximately in the peripheral direction, leaving slotted apertures. This design of the hollow element is structurally simple and also carries a large volume of air below the surface of the water. In this connection it may be desirable to shorten one of the covering webs forming the slotted apertures, preferably the front web of each reaction chamber as viewed in the direction of rotation.

A particularly simple design for the hollow element may be obtained by making the covering webs flat and arranging them so that the said hollow element forms a regular polygon. One satisfactory arrangement is to divide the hollow element into six reaction chambers, thus forming a dodecagon. The said hollow element may be made by welding together single sheets.

According to another characteristic of the invention, the reaction chambers contain baffle-plates running radially and parallel with the axis of rotation of the element, preferably arranged substantially upon the bisectors of the angles between the partitions constituting the reaction chambers. These baffle-plates guide the air and prevent air bubbles which form at the rear of the reaction chambers, upon immersion, from passing prematurely to the front. The said baffle-plates thus provide uniform aeration of the individual parts of the reaction chambers. Baffle-plates measuring between one half and three quarters of the length of the partitions have been found satisfactory.

In conjunction with the baffle-plates, the invention also provides for the axis of rotation to be in the form of a hollow shaft having openings in the area between the baffle plate and the front partition in each reaction chamber, as viewed in the direction of rotation. In this way the volume enclosed in the hollow shaft is also used to convert the sewage. The said openings serve to allow not only the sewage, but also a part of the air carried below the surface of the water, to enter the hollow shaft. This air can then escape through the openings which happen to be at the top of the hollow shaft, thus aerating the residual water still remaining in the emerging chambers. In this connection it has been found sufficient for the dimensions of the said openings to be such as to allow about 10 to 20% of the air enclosed in the reaction chambers to escape into the hollow shaft as it rotates.

According to still another characteristic of the invention, the basin is a good fit around the hollow element and is preferably in the form of a trough having a semicircular bottom. With this arrangement, practically the entire volume of the basin is located in the reaction chambers and is thus aerated. This also makes it possible to provide the largest possible surfaces for biological growth in the smallest possible area. According to the invention, this is achieved by providing the reaction chambers with growth-discs which run radially and at right angles to the axis of rotation. A biological growth consisting of micro-organisms then forms upon these discs, and this contributes substantially to the elimination of harmful substances. The surfaces of the discs may be increased by making them corrugated.

Another way of reducing the power required to drive the hollow element is to arrange it in such a manner that, when the basin is full, between two thirds and three quarters of the said element is immersed therein. In this way, less sewage and sludge is lifted above the surface of the water, and this reduces the power required for lifting.

Finally, provision is made, according to the invention, for the hollow element to be divided, by separating discs running radially of the axis of rotation, into at least two sections, the partitions in the sections being displaced angularly in relation to each other. This arrangement is particularly desirable if the volume of the reaction chambers is relatively large, since otherwise dissimilarities and imbalances occur.

The aerating efficiency of the device may be improved still further by arranging outwardly-open additional chambers externally of the covering webs and between the slotted apertures. The said additional chambers have axially parallel walls provided with outer surfaces. The outer surface of the leading axially parallel wall, as viewed in the direction of rotation, faces downwardly upon emerging from beneath the sewage surface. The outer surface of the lagging axially parallel wall, as viewed in the direction of rotation, faces downwardly at the point of immersion into the sewage. These axially parallel walls preferably consist of wall sections directed substantially axially and adjoining outer wall sections directed substantially peripherally. The end-edges of the outer wall sections, directed substantially peripherally, of each additional chamber, define an axial slot.

This arrangement means that additional chambers are arranged upon the surface of the rotating hollow element. Inasmuch as these are closed and are not taken up by the slotted apertures, the said additional reaction chambers act in a manner substantially similar to the main chambers, but have a generally lesser radial extension.

Whereas the volumes of air carried along by the main reaction chambers, as they pass through the lower part of the trough, always tend to ascend towards the hollow shaft, the additional chambers have the advantage that air may be carried by them directly to the bottom of the trough, where some of it escapes, thus ensuring that even sewage at the very bottom of the trough is aerated. This improves the supply of oxygen as a whole. The said additional chambers also provide additional biological growth surfaces.

The invention is explained hereinafter in greater detail, in conjunction with the example embodiment illustrated in the drawing attached hereto, wherein.

Figure 1:
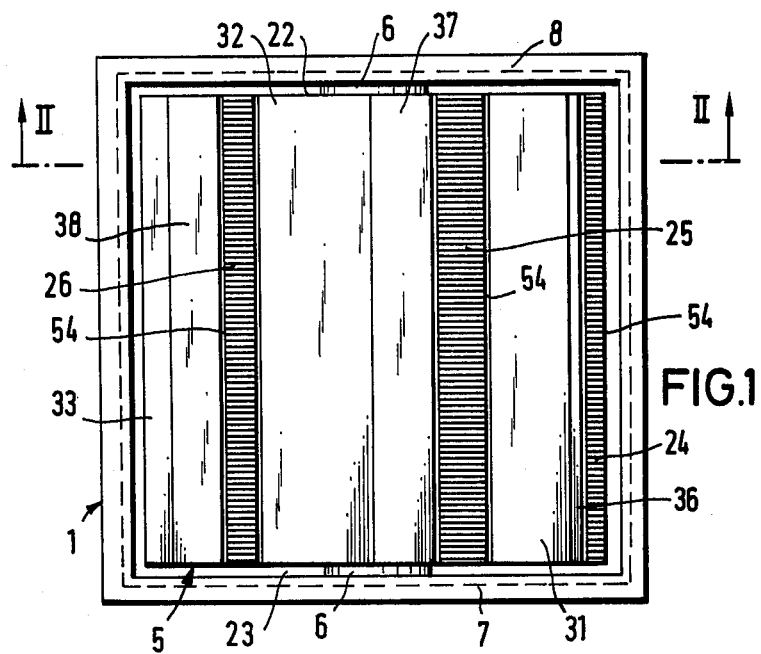
FIG. 1 is a plan view of a reaction basin.
Figure 2:
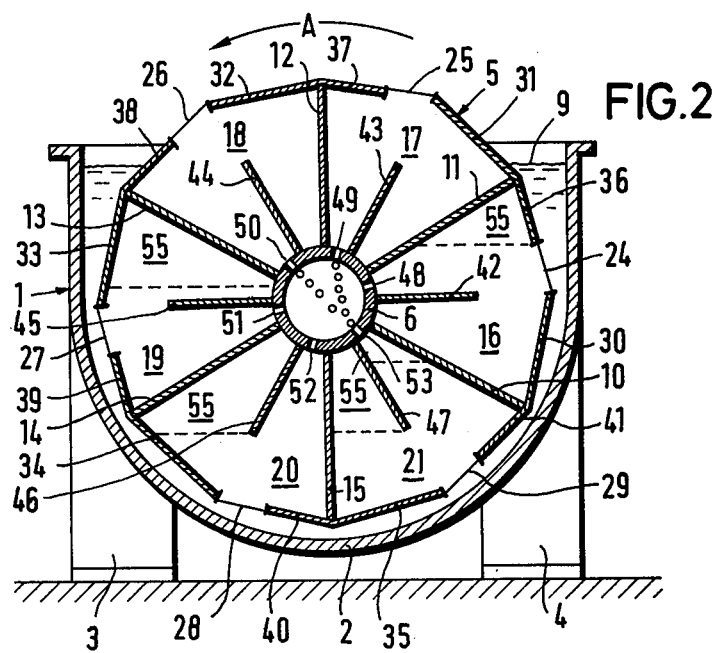
FIG. 2 is a vertical section through the reaction basin along the line B-C in FIG. 1.

FIGS. 1 and 2 illustrate a trough-like reaction basin for a sewage plant, into which sewage may be passed after coarse clarification by mechanical means. Basin 1 is of rectangular outline with a semi-circular bottom 2 and is open at the top. It rests upon four pedestals, only two of which, 3,4, are shown in the figure. A drum-like, cross-sectionally dodecagonal hollow element 5 is located in reaction basin 1 in such a manner as to leave a relatively small space between it and the inner wall of the said basin. Hollow element 5 is mounted, by means of an axis of rotation in the form of a hollow shaft 6, in lateral walls 7,8 of the basin and is driven, in the direction of arrow A, by a motor, not shown. When the basin is full up to level 9, about one quarter to one third of the diameter of the hollow element 5 protrudes above the sewage level 9.

As may be gathered from FIG. 2 in particular, hollow element 5 is divided into six reaction chambers 16–21 by partitions 10–15 running radially outwardly from, and parallel with, axis of rotation 6 and arranged at equally angular distances from each other. These chambers are enclosed by lateral covering discs 22, 23.

Each reaction chamber 16–21 has a slotted aperture 24-29 extending over the whole length of hollow element 5 and allowing an exchange of sewage and air. These slotted apertures are formed in covering webs 30–41 attached to and extending approximately peripherally in both directions from partitions 10–15. Since the front covering webs 36–41, as viewed in the direction of rotation, in each reaction chamber are shorter than the other covering webs 30–35, slotted apertures 24-29 are slightly offset, in the direction of rotation, from the bisectors of each reaction chamber 16–21.

Arranged in the said reaction chambers, upon the bisectors thereof, are baffle-plates 42–47 running from hollow shaft 6. The said baffle-plates are used to guide the air carried along as each reaction chamber is immersed. Between baffle-plates 42–47 and front partition 10–15, as viewed in the direction of rotation, hollow shaft 6 is equipped with openings 48–53 which allow sewage and, at specific locations also air, to enter hollow shaft 6.

Arranged in reaction chambers 16–21 closely together and at right angles to the axis of rotation are settling discs 54 having corrugated surfaces. Deposited onto these discs are biological growths for the biochemical conversion of harmful substances contained in the sewage. As a result of the drum-like design of the hollow element, and the small distance between it and the inner wall of the basin, very large surfaces are available for biological growth even though the outside dimensions of the device are small.

During one revolution of hollow element 5, a relatively large air-bubble is carried below the surface of the water in the submerging reaction chamber, since the front sides of partitions 10–15, as seen in the direction of rotation, and adjoining covering webs 30–35, form a kind of hollow scoop which retains air-bubble 55. As the hollow element continues to rotate, baffle plates 42–47 prevent air-bubble 55 from passing into the front part, as viewed in the direction of rotation, of each reaction chamber, thus ensuring adequate aeration of the rear part.

Air-bubble 55 divides only in the vicinity of the bottom dead centre, part of the said bubble passing into the front part of the relevant reaction chamber. From this part, about 10 to 20% of the air can reach the cavity enclosed in hollow shaft 6, thus ensuring that any sewage therein is also aerated. This air can then escape, through any of openings 48–53 which happen to be at the top, into the reaction chambers that are not immersed, where it aerates any residual water.

In the vicinity of bottom dead centre, air-bubble 55 develops buoyancy acting in the direction of rotation, and this compensates almost completely for the buoyancy in the first half acting in the opposite direction. Thus, the power hitherto required to carry the air under the surface of the water is no longer necessary with the design according to the invention. This saves a considerable amount of power.

As the hollow element continues to rotate, all of air-bubble 55 passes to the front part of the relevant reaction chamber, from which it is prevented from escaping, until the chamber emerges again, by front covering web 36–41, as seen in the direction of rotation, in each reaction chamber. In this way, the assisting buoyancy effect is maintained to the end. In addition to this, the front part of each reaction chamber is thoroughly aerated. This aeration is also assisted by the fact that the air is compressed all the time it is under water, which increases its solubility in water.

Viewed as a whole, hollow element 5 is characterized by the special design of its partitions 10–15 and by the fact that they continue on to form covering webs 30–41. The reaction efficiency is thus particularly high, since optimal aeration of the sewage and biological growths are assured, together with the largest possible surface to which the said growths may adhere. For a given reaction efficiency, the power required is substantially less than in hitherto known designs. The buoyancy forces of the air-bubbles carried along are mutually compensated for throughout the immersion phase by retaining the said bubbles in the reaction chambers, which also results in a substantial decrease in the power required.

The design of the device according to the invention is not restricted to its use as a reaction basin. It may obviously also be used as a sludge-aerating basin, for example to convert the sludge arising during clarification into a product which can safely be disposed of.

Figure 3:
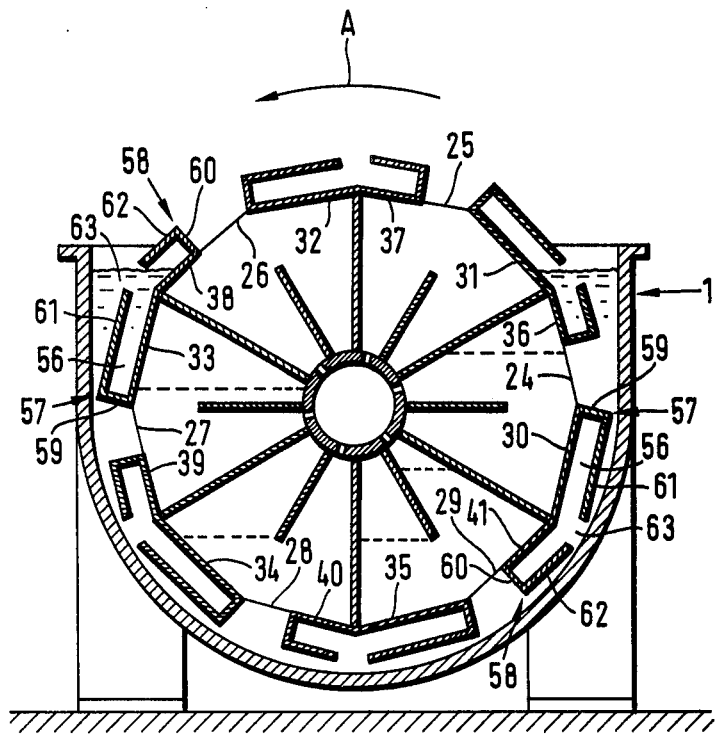
FIG. 3 is a variant of the device according to FIG. 2.

FIG. 3 illustrates another referred example of embodiment which differs from the device illustrated in FIG. 2.

In this case, additional chambers 56 are arranged upon a wide covering web 30–35 and a narrow covering web 36–41 in the main chambers, so that only slotted apertures 24–29 of the main chambers remain free. Each additional chamber consists of an axially-parallel wall 57 which leads, as viewed in the direction of rotation A of the hollow element, of an axially-parallel wall 58 which lags, and of lateral end-walls not shown in the drawing. Covering webs 30–41 form the bottom surfaces of the additional chambers. Each leading wall 57 consists of a substantially radial wall-section 59 and of a wall-section 61 adjoining radial section 59 in a direction opposite to the direction of rotation and directed substantially peripherally. Lagging wall 58 consists, accordingly, of a substantially radial wall-section 60 and of a wall-section 62 adjoining this section in the direction of rotation and directed substantially peripherally. Wall-sections 61,62, directed substantially peripherally, define between them an axial slot 63 which operates substantially in the same way as slotted apertures 24–29 in the main chambers.

In this special embodiment, axial slot 63 is arranged approximately in the vicinity of the transition between a narrow covering web 36–41 and a wide covering web 30–35. Wall-sections 61,62 directed substantially peripherally, are made of flat sheet-metal and run substantially parallel with the covering webs in the main chambers.

Upon immersion into the liquid and as the element rotates, lagging walls 58 carry along a volume of air which remains trapped in the lagging part of the relevant additional chamber 56 almost until bottom dead centre is reached. As bottom dead centre is passed, the air carried along passes slowly into the leading part of the additional chamber, but some of it escapes through axial slot 63 into the surrounding sewage. Air trapped during immersion of the additional chambers behind leading wall 57 also produces buoyancy in the additional chambers which prevents any undue increase in the drive-power. Upon emerging from the liquid, lagging wall 58 carries along a volume of water which, upon reaching top dead centre, escapes in part from the additional chamber and is thus brought into contact with the ambient air. Part of this air, however, also passes to the leading part of the additional chamber and thus also assists in rotating the hollow element. The discharge of air from additional chamber 56, near bottom dead centre, and the discharge of water from the additional chamber, near top dead centre, is aided by the fact that the lateral end-walls comprise, in the vicinity of the axial slots, an opening which may extend as far as the bottom of the additional chamber. As a result of this, more air is released, near bottom dead centre, into the sewage located in the bottom part of the trough, whereas, near top dead centre, a larger amount of water trickles back through the ambient air into the trough. Air or water may be deliberately allowed to escape from the additional chambers, through the said lateral openings in the end-faces of the additional chambers, through perforations arranged elsewhere in the defining walls of the additional chambers. The arrangement and magnitude of such openings depends upon how much air or water is to escape from the additional chambers, and at what point during the rotation, in order to achieve an optimal aerating effect. The most satisfactory arrangement is also dependent upon the level of the liquid in the trough and may easily be determined by one skilled in the matter.

The additional chambers arranged at the periphery of the hollow element may also differ from the design shown in FIG. 3, as long as they fulfill the purpose of the invention, namely to introduce additional air mainly into the sewage at the bottom of the trough, and also to raise the sewage up in order to bring it into contact with the ambient air.

I claim:

1. A device for aerating sewage or sewage-sludges for the purpose of converting any harmful substances contained therein into harmless substances, said device comprising a sludge-aerating basin, a hollow element positioned to rotate therein about its axis, said hollow element being spaced from the inner wall of said basin; a portion of said hollow element protruding above sewage level when the basin is full, said hollow element having partitions directed parallel to and substantially and radially outwardly from the axis of rotation forming outwardly-open reaction chambers, the outer ends of said partitions continue approximately peripherally in both directions forming front and rear covering webs adjacent their outer portions having slotted apertures therebetween, with the front covering webs extending downwardly at the point where the partition dips beneath sewage surface, and the rear covering webs extending downwardly at the point where the partition emerges from beneath the sewage surface, said reaction chambers having baffle-plates directed radially from, and parallel with, the axis of rotation, for guiding air, the air effervescing around said baffle plates and being retained in said reaction chambers.

2. A device according to claim 1, wherein one of the two covering webs in each case is shortened in order to form the covering webs in each case is shortened in order to form the slotted apertures.

3. A device according to claim 2, wherein the front covering web, as viewed in the direction of rotation, in each reaction chamber is shortened.

4. A device according to one of claims 2 or 3, wherein the covering webs are made flat and are arranged in such a manner that the hollow element constitutes a regular polygon.

5. A device according to one of claims 2 or 3, wherein the hollow element is divided into six reaction chambers.

6. A device according to claim 4, wherein the hollow element is in the form of a dodecagon.

7. A device according to claim 1, wherein the baffle-plates are arranged substantially upon the bisectors of the angles between the partitions forming the reaction chambers.

8. A device according to claim 7, wherein the baffle-plates are between one half and three quarters as long as the partitions.

9. A device according to claim 8, wherein the axis of rotation is in the form of a hollow shaft equipped with openings in the area between the baffle-plate and the front partition, as viewed in the direction of rotation, in each reaction chamber.

10. A device according to claim 9, wherein the dimensions of the openings are such that, during rotation, about 10 to 20% of the air enclosed in the reaction chambers escapes into the hollow shaft.

11. A device according to claim 1, wherein the basin is a close fit around the hollow element, being in the form of a trough with a semi-circular bottom.

12. A device according to claim 1, wherein discs for the formation of biological growths are located in the reaction chambers, the said discs directed at right angles to the axis of rotation and projecting radially therefrom.

13. A device according to claim 12, wherein the said discs have corrugated surfaces.

14. A device according to claim 1, wherein when the basin is full, about two thirds to three quarters of the height of the hollow element is immersed therein.

15. A device according to claim 1, wherein the hollow element is divided into at least two sections by separating discs running radially and at right angles to the axis of rotation.

16. A device according to claim 1, wherein arranged on the outside of the covering webs, between the slotted apertures, are outwardly-open additional chambers defined by axially-parallel walls having outer peripheral wall sections, the outer peripheral wall sections of the leading axially-parallel walls, as viewed in the direction of rotation, face downwardly at the point of emerging from beneath the surface of the sewage, whereas the outer peripheral wall sections of the lagging axially-parallel walls, as viewed in the direction of rotation, face downwardly at the point of immersion.

17. A device according to claim 16, wherein the axially-parallel walls consist of wall sections which are directed substantially radially and adjoin wall sections directed substantially peripherally, the end edges of the said peripheral wall sections of each chamber defining an axial slot.

18. A device as defined in claim 1, wherein the baffle-plates are arranged substantially upon the bisectors of the angles between the partitions forming the reaction chambers, the baffle-plates being between one half and three quarters as long as the partitions, the axis of rotation being in the form of a hollow shaft equipped with openings in the area between the baffle-plate and the front partition, as viewed in the direction of rotation, in each reaction chamber.

* * * * *